May 5, 1936.  C. L. CARROLL  2,039,392
BOAT PROPELLING MECHANISM
Filed June 12, 1933
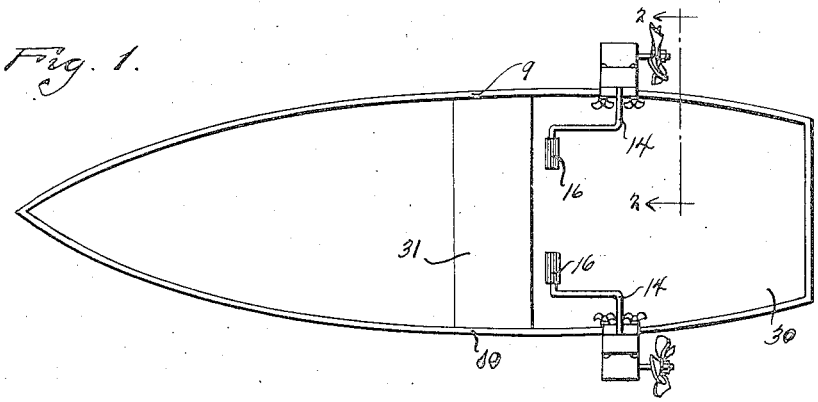
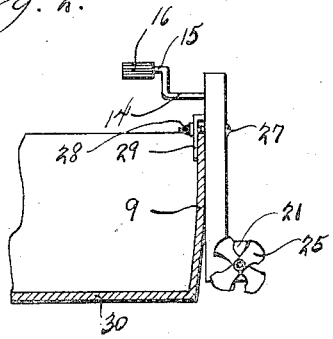
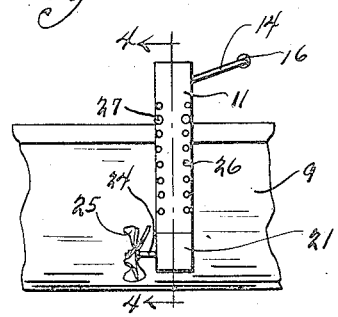
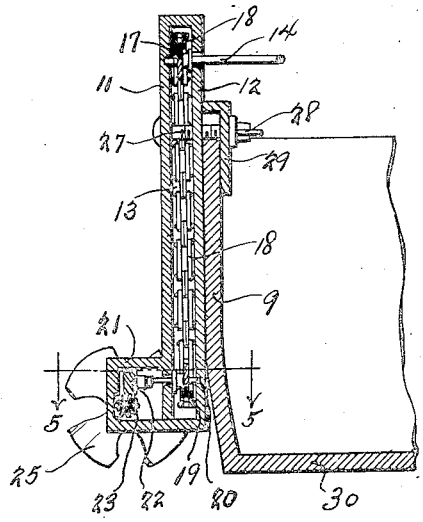
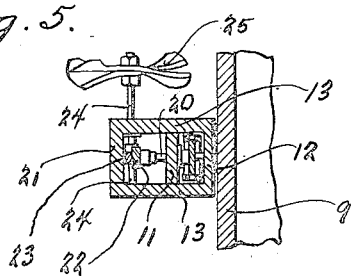
INVENTOR.
Cleveland L. Carroll
BY
ATTORNEY.

Patented May 5, 1936

2,039,392

UNITED STATES PATENT OFFICE 2,039,392

BOAT PROPELLING MECHANISM

Cleveland L. Carroll, Owosso, Mich.

Application June 12, 1933, Serial No. 675,439

1 Claim. (Cl. 115—21)

My invention relates to a new and useful improvement in a boat propelling mechanism adapted for use primarily with those boats which are propelled by hand power through the medium of oars and the like.

It is an object of the present invention to provide a boat propelling device in which a crank operated mechanism may be used for propelling the boat.

Another object of the invention is the provision of a hand operated mechanism for rotating a screw propeller.

Another object of the invention is the provision of a boat propelling mechanism of this type which may be easily and quickly attached to and detached from a boat with which used.

Another object of the invention is the provision of a device of this class which will be simple in structure, economical to manufacture, durable, compact and highly efficient in use.

Another object of the invention is the provision of a device of this class which may be detachably mounted on a boat and which will serve to maintain the propeller or other driving mechanism positioned to lie above the bottom of the boat so that its contact with stones, projections or the like may be prevented.

Other objects will appear hereinafter.

The invention consists in the combination and arrangement of parts hereinafter described and claimed.

The invention will be best understood by a reference to the accompanying drawing which forms a part of this specification, and in which, Fig. 1 is a top plan view of a boat showing the invention applied.

Fig. 2 is a fragmentary sectional view taken on line 2—2 of Fig. 1.

Fig. 3 is a side elevational view of the invention, showing it applied.

Fig. 4 is an enlarged sectional view of the invention taken on line 4—4 of Fig. 3.

Fig. 5 is a sectional view taken on line 5—5 of Fig. 4.

In Fig. 1 I have indicated the invention applied to a boat having side walls 9 and 10. The invention comprises a box like housing having the front wall 11, the rear wall 12 and side walls 13. Projected into the housing at the upper end thereof is a shaft 14 on which is formed the crank 15 having a suitable hand grip 16 mounted thereon. Within the housing there is fixedly mounted on the shaft 14 a sprocket wheel 17 passing around which is the endless sprocket chain 18 so that a rotation of the shaft 14 will serve to drive or rotate the sprocket wheel 19 which is located at the base of the housing and fixedly mounted on the shaft 20. This shaft 20 projects into the auxiliary housing 21 which is mounted on and projects outwardly of the outer face of the front wall 11 of the main housing. Fixedly mounted on the shaft 20 within the housing 21 is a worm 22 meshing with the worm gear 23 fixedly mounted on the shaft 24. This shaft 24 projects outwardly from the housing 21, and fixedly mounted on the shaft 24 is a screw propeller 25. It will be noted that the shaft 24 extends at right angles to the direction of the shaft 14.

A plurality of openings 26 are formed through the housing first described which may be termed the vertically extended housing. Projecting through these openings are bolts 27 on which are threaded the wing nuts 28 to clamp the L shaped clamping plate 29 against the side walls 9 or 10 of the boat so as to securely mount the vertically extended housing in position thereon. It will be noted that this housing is mounted in such a position that its lower end is positioned well above the bottom 30 of the boat so that the propeller blades do not project below the bottom of the boat. By loosening the wing nuts 28, the device may be removed easily and quickly from the boat and it is believed obvious that its attachment to the boat may be just as easily and quickly effected.

When these devices are mounted in position so that the operator seated on the seat 31 of the boat may rotate the shafts 14, a very efficient propeller mechanism is thus provided and the propelling of the boat may be easily effected and with greater speed and with less effort than is ordinarily effected with a pair of oars. It is obvious that the ratio between the gears 17, 19 and the worm 22 and the worm gear 23 must be such as to transmit the desired speed of rotation to the shafts 24 when the shafts 14 are rotated. Another advantage of such a construction is a quiet operation and steady travel of the boat, thus eliminating splashing and the noises ordinarily incident to the rowing of a boat.

It is believed that the economy of manufacture is obvious from the description given while the compactness of the structure is also believed apparent.

The housing 21 may be filled with suitable lubricant and by mounting the shafts in suitable bearings of an anti-friction type, a smoothly operating device becomes possible. The vertically extended housing, because of its enclosing the sprocket chain and the sprocket wheels, will serve to protect the device from foreign material such as dust, weeds and the like, while at the same time the proper lubrication may be maintained on the parts necessary to be lubricated.

The provision of the holes 26 permits the device to be adjusted to boats of various sizes so that it may be universal in its adoption for use.

While I have illustrated and described the preferred form of construction of my invention, I do not wish to limit myself to the precise details of structure shown but desire to avail myself of such variations and modifications as may come within the scope of the appended claim.

Having thus described my invention, what I claim as new and desire to secure by Letters Patent is:

A boat propelling mechanism comprising a vertically extending housing, means for attaching said housing to a side wall of a boat, an auxiliary housing projecting outwardly from the outer side of said first mentioned housing adjacent the bottom thereof, said outer side of said first mentioned housing forming a partition between said auxiliary housing and said first mentioned housing, a crank shaft projected at one end into said vertically extending housing adjacent its upper end, a sprocket wheel fixedly mounted on said crank shaft within said housing, a second shaft extending into said vertically extending housing and into said auxiliary housing, said shaft passing through said side of the vertically extending housing, a sprocket wheel fixedly mounted on said second shaft within the vertical extending housing, a sprocket chain connecting said sprocket wheels, a propeller shaft projecting outwardly from said auxiliary housing and extending parallel to the side wall of the boat, gearing located in said auxiliary housing and associated with said second shaft and said propeller shaft for effecting a rotation of said propeller shaft upon a rotation of said crank shaft, and said auxiliary housing serving as a lubricant chamber for said gearing.

CLEVELAND L. CARROLL.